(12) United States Patent
Taylor et al.

(10) Patent No.: US 7,780,198 B2
(45) Date of Patent: Aug. 24, 2010

(54) INDEPENDENTLY ADJUSTABLE CHASSIS SKIRT MOUNTING ASSEMBLY

(75) Inventors: Lance A. Taylor, Fort Wayne, IN (US); James H. Merriman, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 190 days.

(21) Appl. No.: 12/056,936

(22) Filed: Mar. 27, 2008

(65) Prior Publication Data

US 2009/0243320 A1 Oct. 1, 2009

(51) Int. Cl.
*B62D 24/00* (2006.01)

(52) U.S. Cl. ............... 280/833; 180/164.1; 296/180.2; 411/389

(58) Field of Classification Search ......... 280/833, 280/831, 848, 849, 770, 768, 154, 854, 853; 296/180.2, 180.3, 191; 411/388, 389; 403/480.1
See application file for complete search history.

(56) References Cited

U.S. PATENT DOCUMENTS

| | | | | |
|---|---|---|---|---|
| 2,525,217 A | * | 10/1950 | Glitsch | 292/256.73 |
| 2,746,780 A | * | 5/1956 | Comino | 52/846 |
| 2,990,920 A | * | 7/1961 | Hoffman, Jr. | 52/633 |
| 3,492,906 A | * | 2/1970 | Hauser | 411/389 |
| 3,674,246 A | * | 7/1972 | Freeman | 261/114.1 |
| 3,731,961 A | * | 5/1973 | Becker | 403/408.1 |
| 4,035,093 A | * | 7/1977 | Redshaw | 403/4 |
| 4,991,906 A | | 2/1991 | Fingerie | |
| 5,788,321 A | | 8/1998 | McHorse et al. | |
| 6,007,102 A | | 12/1999 | Helmus | |
| 7,163,258 B2 | | 1/2007 | Dyer, II et al. | |
| 7,360,779 B2 | * | 4/2008 | Crandall | 280/163 |
| 7,578,546 B2 | * | 8/2009 | Grady et al. | 296/191 |
| 2002/0005312 A1 | * | 1/2002 | Gollungberg | 180/314 |
| 2007/0177959 A1 | * | 8/2007 | Chopp et al. | 411/389 |

* cited by examiner

*Primary Examiner*—Anne Marie M Boehler
(74) *Attorney, Agent, or Firm*—Jeffrey P. Calfa; Mark C. Bach

(57) ABSTRACT

A chassis skirt mounting assembly (110) for a vehicle having a tank (14) and a chassis skirt (16) includes a tank strap bracket (120) attached to the tank, the tank strap bracket having a first adjustment slot (130) with a first length dimension. An adjustment bracket (122) is attached to the chassis skirt (16) and has a second adjustment slot (138) with a second length dimension oriented generally 90-degrees offset from the first length dimension of the first adjustment slot (130). A double-sided stud (140) is disposed through the first adjustment slot (130) and the second adjustment slot (138) to allow the independent adjustment of the double-sided stud with respect to the first adjustment slot from the adjustment of the double-sided stud with respect to the second adjustment slot.

15 Claims, 5 Drawing Sheets ized around the tank. A double-sided stud of the present invention allows for three-dimensional adjustment and eliminates the need to perform multiple steps to make adjustments to the chassis skirt.

INDEPENDENTLY ADJUSTABLE CHASSIS SKIRT MOUNTING ASSEMBLY

FIELD OF THE INVENTION

The present invention relates generally to automotive body construction, and more particularly, to an independently adjustable chassis skirt mounting.

BACKGROUND OF THE INVENTION

Typically, automotive vehicles include a frame, also referred to as a chassis, which provides the primary structural support for the vehicle. Contemporary styling and good aerodynamic practice in truck design make use of chassis skirts which cover the lower portions of the truck chassis. Prior art chassis skirts are attached to a framework which depends from the vehicle chassis with bolts. A disadvantage of these chassis skirts is that access to some components which are mounted on the frame rails or on supports depending from the frame rails of the vehicle chassis is obstructed by the chassis skirt. Inspection or repair of these components can require removal of the chassis skirt, and can require a technician to crawl under the truck to make adjustments.

Another type of known chassis skirts are tank-mounted skirts. While tank-mounted skirts reduce the cost and weight associated with a chassis skirt, tank mounted skirts introduce much larger tolerance stack-ups into the assembly. Adjustments on the tank-mounted skirts are very cumbersome and can take hours to complete. Often, if the chassis skirt and tank assemblies are assembled correctly, one of the other components on the truck, such as the frame rails or cab, would be misaligned enough to cause the skirts to rub on the hood or on each other.

Prior art chassis skirts are only adjustable radially (both vertically and horizontally dependently together) around the fuel tanks. Since there is limited room between the tanks, steps and chassis skirts, it was not believed that adjustment in three axes could be provided. Since radial adjustment causes the skirts to be adjusted both vertically and horizontally at the same time, a desired vertical alignment may be obtained, but in doing so, the horizontal alignment (cross-car) might become misaligned, or vice versa. The result is chassis skirts that are not properly aligned.

SUMMARY OF THE INVENTION

A chassis skirt mounting assembly for a vehicle having a tank and a chassis skirt includes a tank strap bracket attached to the tank, the tank strap bracket having a first adjustment slot with a first length dimension. An adjustment bracket is attached to the chassis skirt and has a second adjustment slot with a second length dimension oriented generally 90-degrees offset from the first length dimension of the first adjustment slot. A double-sided stud is disposed through the first adjustment slot and the second adjustment slot to allow the independent adjustment of the double-sided stud with respect to the first adjustment slot from the adjustment of the double-sided stud with respect to the second adjustment slot.

DESCRIPTION OF A PREFERRED EMBODIMENT

Figure 1:
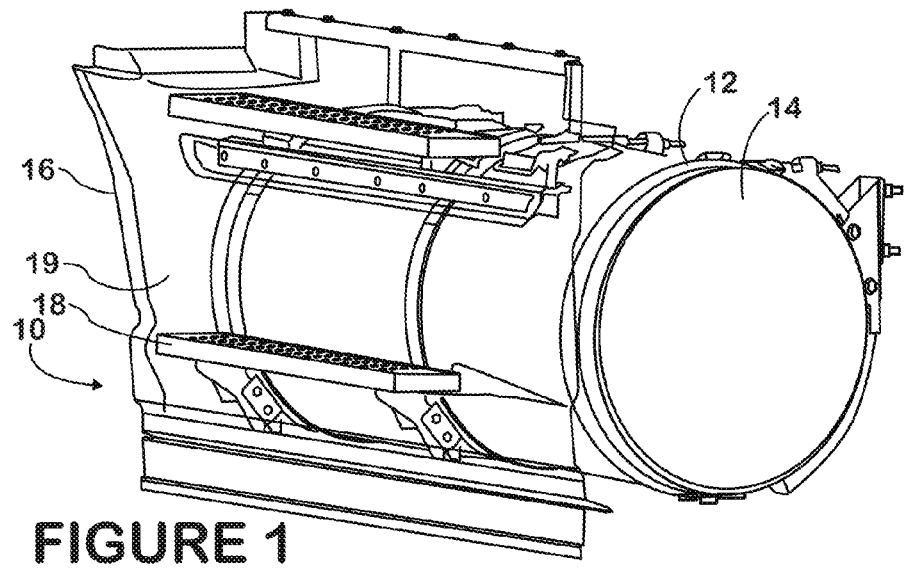
FIG. 1 is a front perspective view of a prior art chassis skirt assembly.
Figure 2:
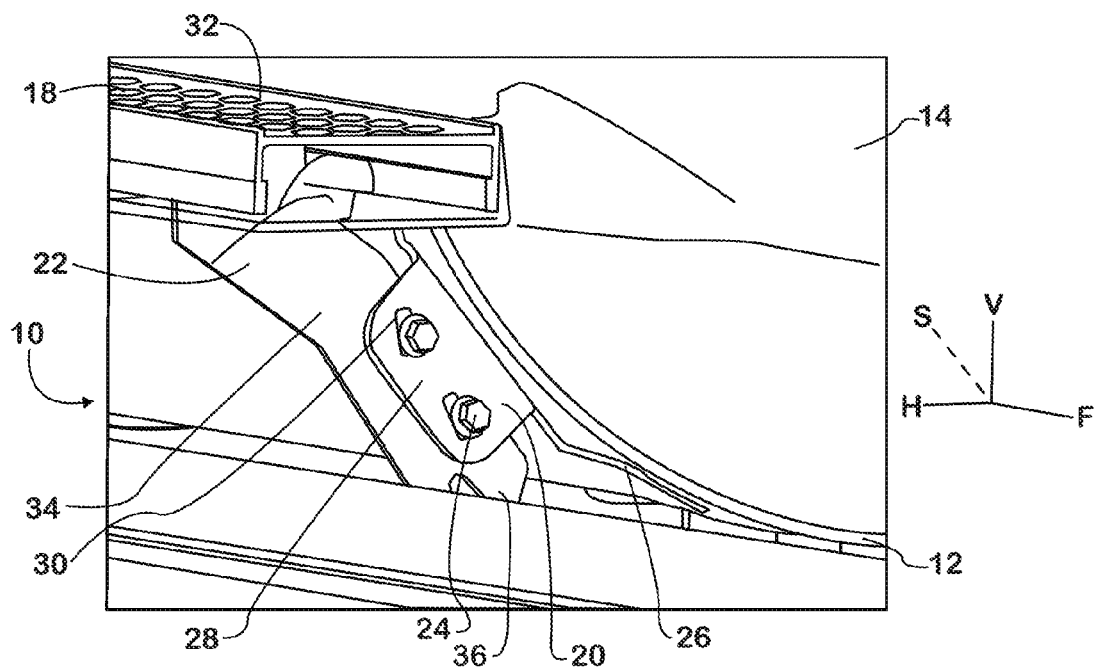
FIG. 2 is a detailed perspective view of the prior art chassis skirt assembly.

Referring to FIG. 1 through FIG. 2, a prior art chassis skirt mounting assembly is indicated generally at 10, and is attached to a tank strap 12 of a tank 14, and to a chassis skirt 16 of a vehicle (not shown). The tank 14 is generally cylindrical and the plurality of tank straps 12 extend generally around the circumference of the tank. The chassis skirt 16 is a panel primarily used to promote a streamlined appearance to the truck and to hide components, such as the tank 14, from the outside of the vehicle chassis. The chassis skirt 16 provides protection to the components and reduces the air drag coefficient. At least one step 18 extends from an outwardly facing surface 19 of the chassis skirt 16 to enable passengers to climb into the cab.

The chassis skirt mounting assembly 10 includes a tank strap bracket 20 that is attached to the tank strap 12, and an adjustment bracket 22 that is attached to the chassis skirt 16. At least one bolt 24 is used to attach the tank strap bracket 20 to the adjustment bracket 22. The tank strap bracket 20 includes a first portion 26 that extends around a portion of the circumference of the tank 14, and a second portion 28 that extends radially from the first portion 26 at a generally 90-degree angle. A first adjustment slot 30 is disposed through the second portion 28. The length dimension of the slot 30 is parallel to a tangential line disposed on the tank 14 at the location of the second portion 28, orienting the slot at a generally 45-degree angle "S" with respect to the vertical "V" and horizontal "H" directions. In this configuration, the length dimension of the slot 30 is oriented to have both a vertical and a horizontal component.

The adjustment bracket 22 has a first portion 32 that is generally parallel to and attached to the step 18, a second portion 34 that is in a parallel plane to and attached to the second portion 28 of the tank strap bracket 20, and a third portion 36 that is attached to the chassis skirt 16. The second portion 34 has at least one receiving hole (not shown) to receive the at least one bolt 24. When the chassis skirt 16 is placed into position, the bolt 24 is inserted through the slot 30 in the second portion 28 of the tank strap bracket 20 and through the hole in the second portion 34 of the adjustment bracket 22.

If adjustments are required, the prior art chassis skirt mounting assembly 10 only provides a radial adjustment, which causes the chassis skirt to be adjusted both in the vertical "V" and horizontal "H" directions at the same time as the bolt 24 is positioned in the slot 30 along the axis "S". No independent vertical or horizontal adjustment can be accomplished in the prior art chassis skirt mounting assembly 10.

Figure 3:
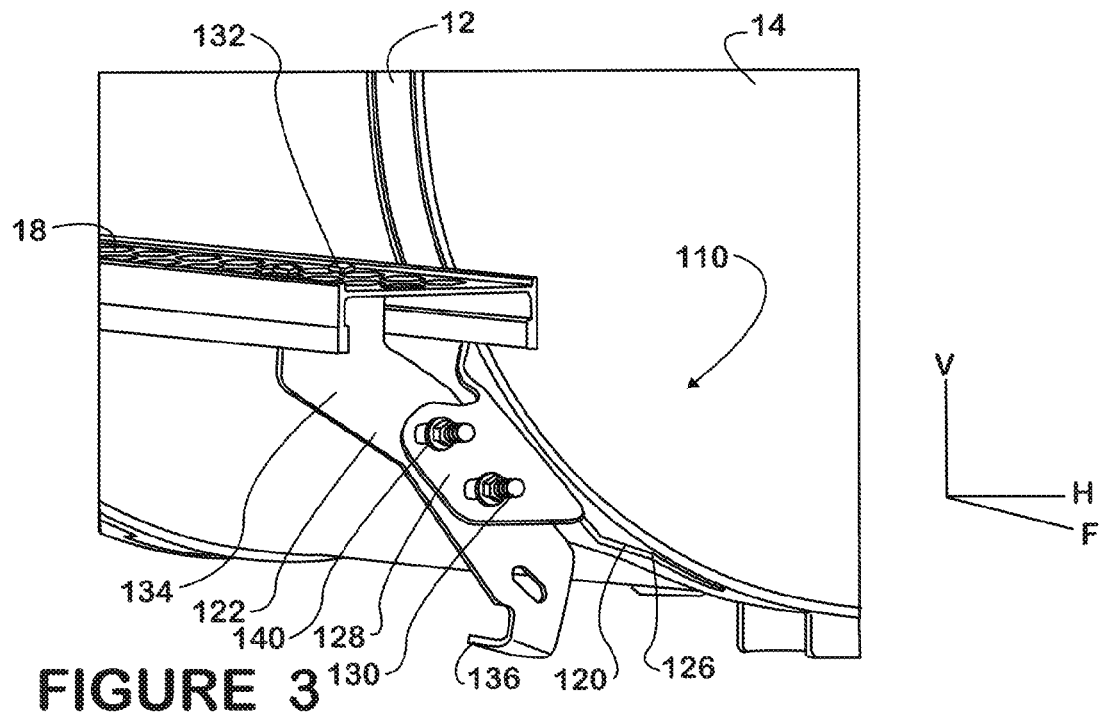
FIG. 3 is a front perspective view of a chassis skirt mounting assembly showing the horizontal adjustment in accordance with the invention.
Figure 4:
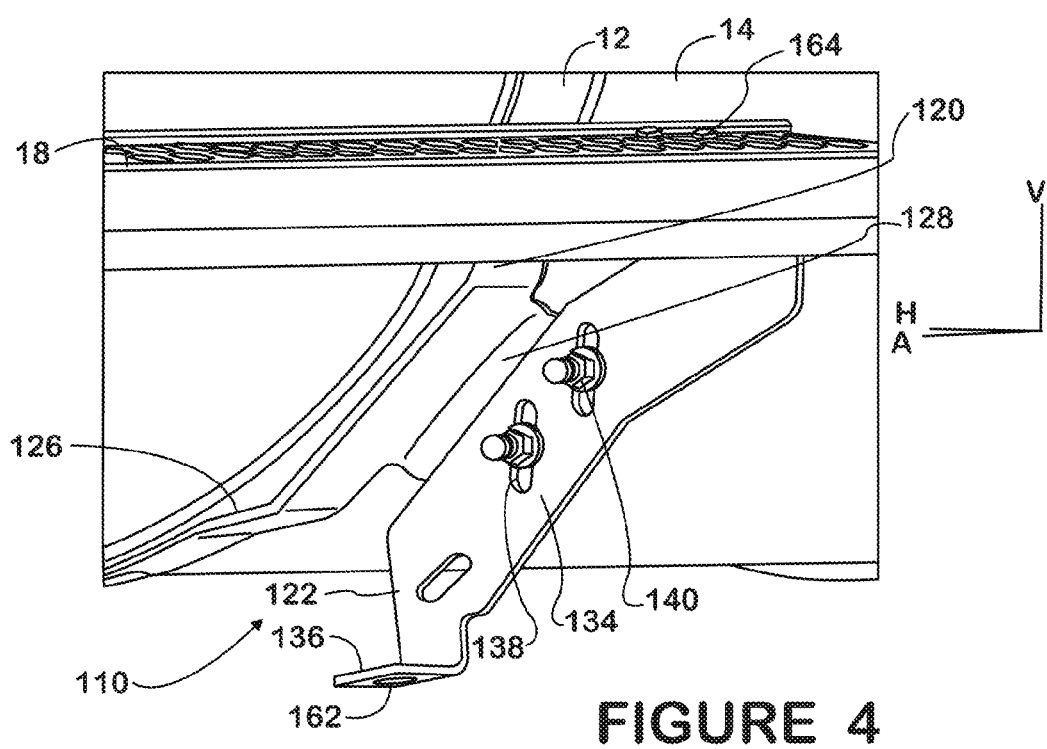
FIG. 4 is rear perspective view of the chassis skirt mounting assembly showing the vertical adjustment in accordance with the invention.
Figure 5:
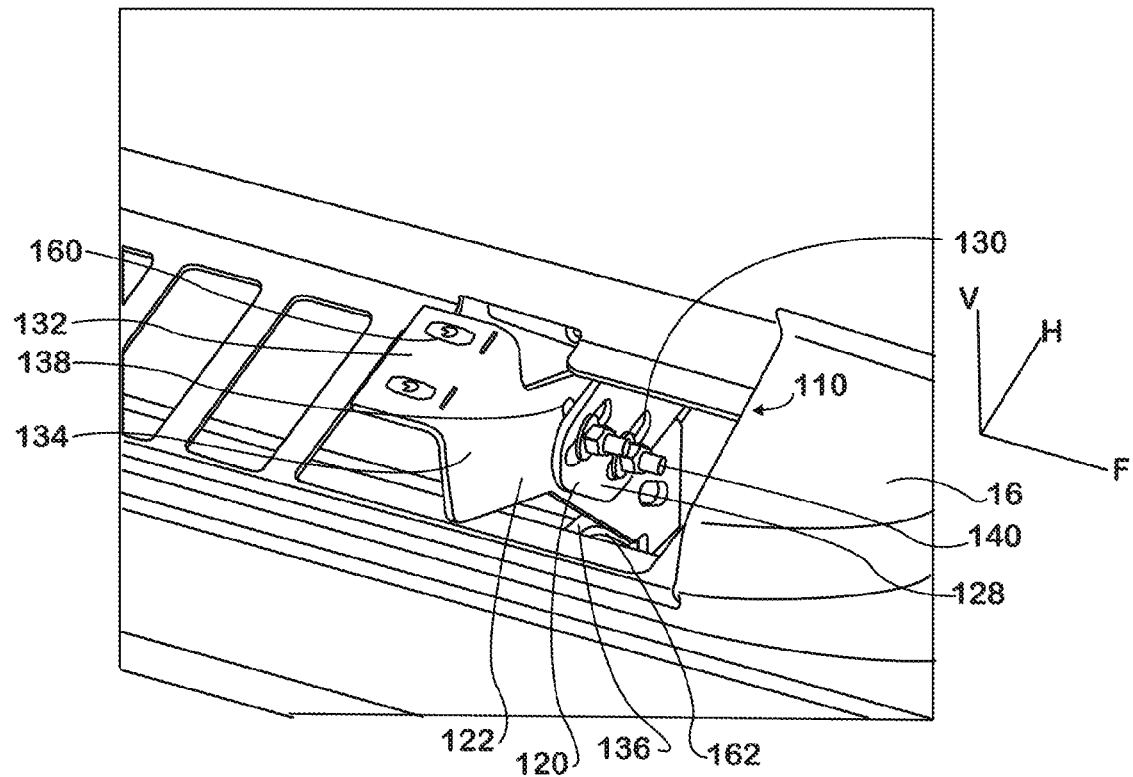
FIG. 5 is a top perspective view of the chassis skirt mounting assembly showing the fore/aft adjustment in accordance with the invention.

Referring now to FIGS. 3-9, a chassis skirt mounting assembly is depicted generally at 110 and is attached to a tank strap 12 of a tank 14, and to a chassis skirt 16 (see FIG. 5). At least one step 18 extends from an outwardly-facing surface 19 and horizontally with respect to the tank 14 to enable passengers to climb into the cab.

The chassis skirt mounting assembly 110 includes a tank strap bracket 120 that is attached to the tank strap 12, and an adjustment bracket 122 that is attached to the step 18, and to the chassis skirt (not shown). The tank strap bracket 122 includes a first portion 126 that extends around a portion of the circumference of the tank 14, and a second portion 128 that extends radially from the first portion at a generally 90-degree angle. A first adjustment slot 130 is disposed through the second portion 128. The slot 130 has a length dimension that is oriented to be substantially horizontal "H", and advantageously, the length dimension is oriented to have no vertical "V" component.

The adjustment bracket 122 has a first portion 132 that is generally parallel to and attached to the step 18 to lay in a substantially horizontal "H" plane, a second portion 134 that lays in a generally vertical plane "V" and is attached to the second portion 128 of the tank strap bracket 120, and a third portion 136 that is configured to be attached to the chassis skirt (not shown). The second portion 134 has a second adjustment slot 138 disposed through the second portion and having a length dimension oriented to be substantially vertical "V", and advantageously, the length dimension is oriented to have no horizontal "H" component.

Figure 6:
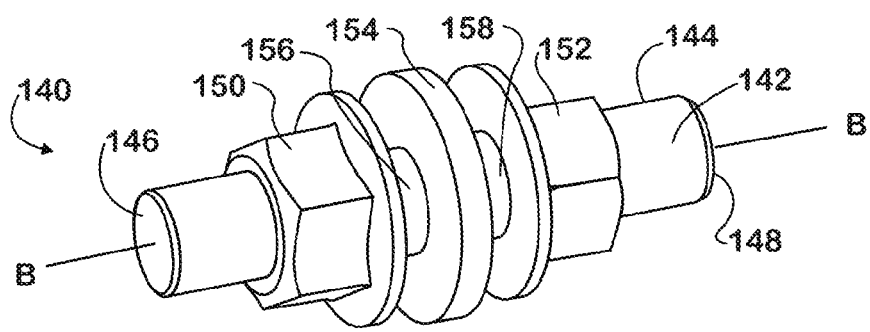
FIG. 6 is a perspective view of a doubled-sided stud in accordance with the invention.
Figure 7:
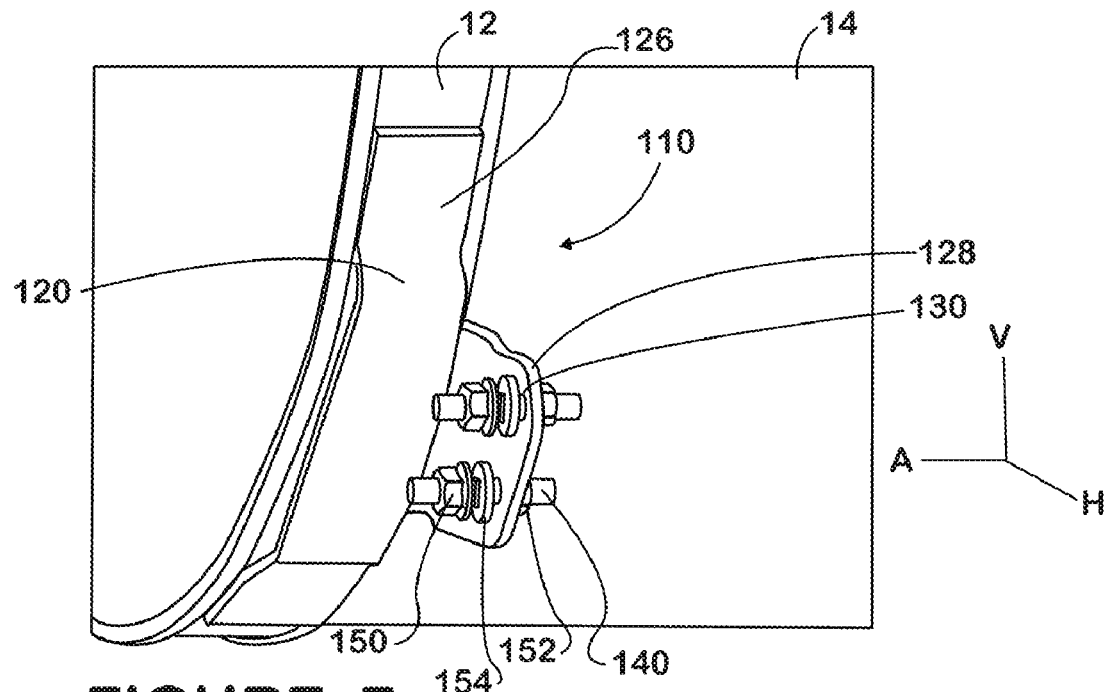
FIG. 7 is a rear perspective view of a tank strap bracket of the chassis skirt mounting assembly having the double-sided stud for horizontal adjustment in accordance with the invention.
Figure 9:
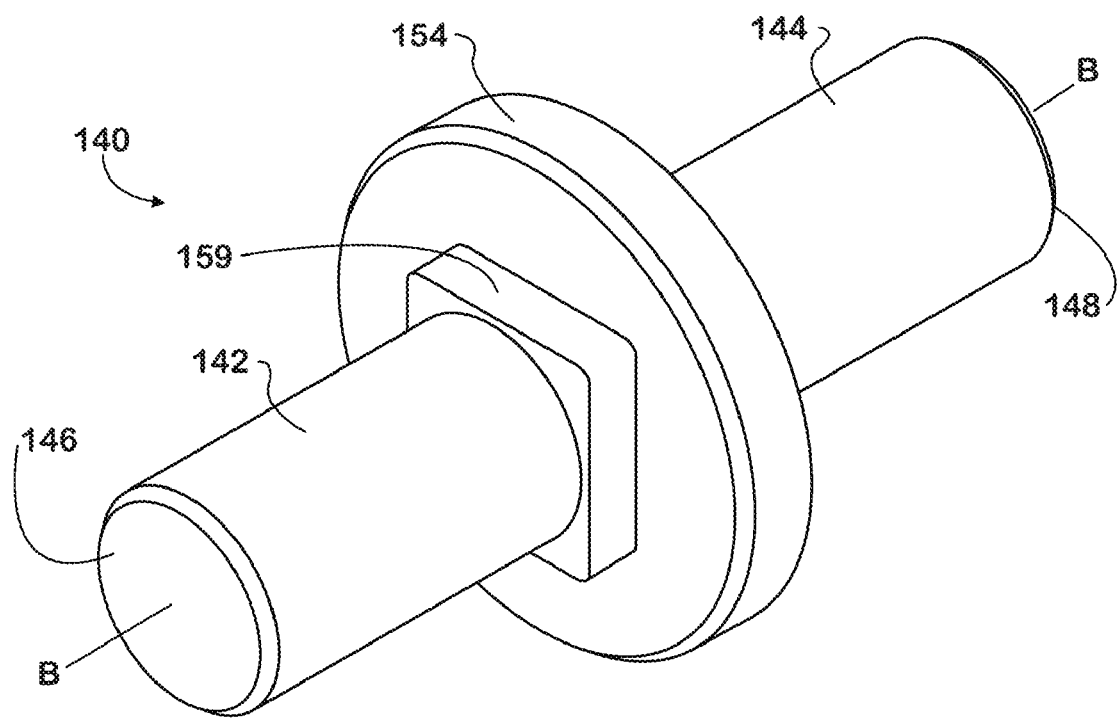
FIG. 9 is a perspective view of a shaft and spacer of the doubled-sided stud in accordance with the invention

When the chassis skirt 16 is placed into position, a double-sided stud 140 is inserted through the first adjustment slot 130 in the second portion 128 of the tank strap bracket 120 and through the second adjustment slot 138 in the second portion 134 of the adjustment bracket 122. Referring now to FIGS. 6 and 9, the double-sided stud 140 has a generally tubular shank 142 with an outer surface 144, and has a first end 146 and a second end 148. The shank 142 forms an axis "B". At the first end 146, a first threaded fastener 150 is received by the shank 142 along the axis "B" towards the center of the shank. At the second end 148, a second threaded fastener 152 is received by the shank 142 along the axis "B" towards the center of the shank. Disposed between the first threaded fastener 150 and the second threaded fastener 152 is a spacer 154. Between the spacer 154 and the first threaded fastener 150 is a first receiving space 156 and between the spacer and the second threaded fastener 152 is a second receiving space 158.

As seen in FIG. 9, an anti-rotation structure 159 is advantageously disposed on each side surface of the spacer 154. The anti-rotation structure 159 is configured to fit within the first adjustment slot 130 and the second adjustment slot 138 to prevent the double-sided stud 140 from spinning during torquing of the first and second fasteners 150, 152. In this configuration, the first and second fasteners 150, 152 on either side of the spacer 154 can be individually tightened or loosened.

Referring again to FIGS. 3-9, when the tank strap bracket 120 is attached to the adjustment bracket 122, the first end 146 of the shank 142 is inserted into the second adjustment slot 138 of the adjustment bracket such that the spacer 154 is on one side of the slot, and the first threaded fastener 150 is used to secure the adjustment bracket on the other side of the slot. The second end 148 of the shank 142 is inserted into the first adjustment slot 130 of the tank strap bracket 120 such that the spacer 154 is between the tank strap bracket and the adjustment bracket 122, and the second threaded fastener 152 is inserted onto the shank to secure the tank strap bracket on the other side of the spacer. In this way, the adjustment bracket 122 is disposed in the first receiving space 156 and the tank strap bracket 120 is disposed in the second receiving space 158. The spacer 154 obviates the need to have a separate slip plate between the tank strap bracket 120 and the adjustment bracket 122.

When adjustments in the horizontal "H" and/or vertical "V" directions are needed, the technician merely has to loosen the threaded fastener 150, 152 that clamps the particular axis (horizontal or vertical), adjust that axis, and retighten the threaded fastener. With the configuration of the slots 130, 138 and the double-sided stud 140, the adjustment of one particular axis (horizontal or vertical), will not affect the alignment of the other axis.

Figure 8:
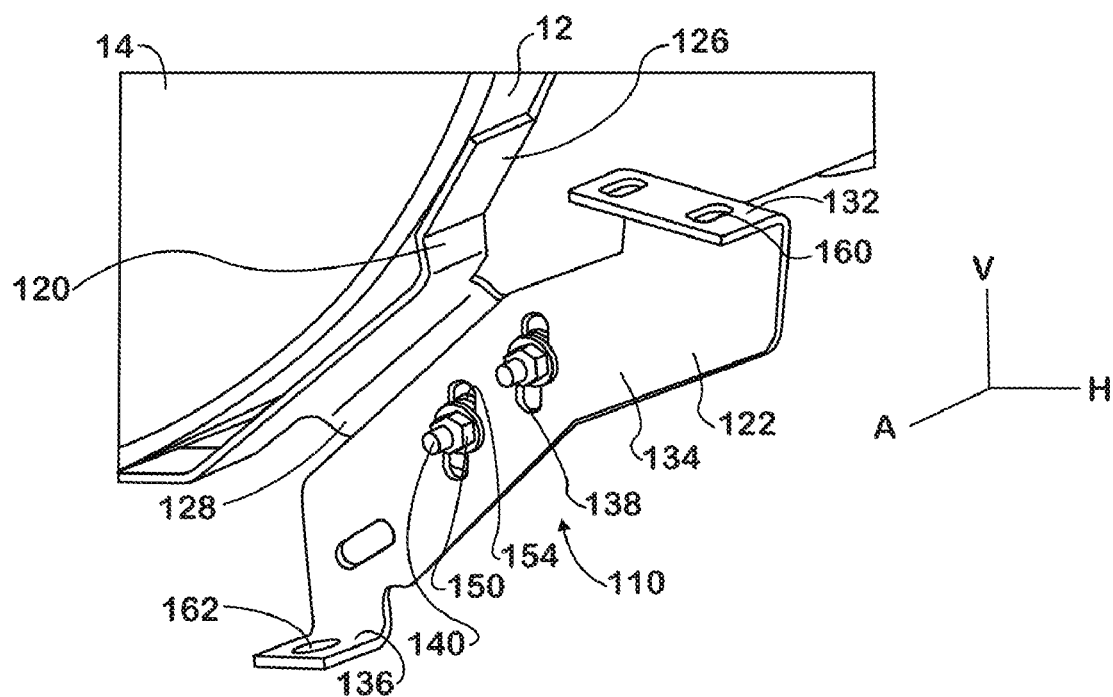
FIG. 8 is a rear perspective view of an adjustment bracket and the tank strap bracket of the chassis skirt mounting assembly attached with the double-sided stud for vertical and horizontal adjustment in accordance with the invention.

As best seen in FIGS. 3, 4 and 8, the forward "F" and aft "A" adjustment is provided by the at least one third adjustment slot 160 disposed in the first portion 132 of the adjustment bracket 122 and the at least one fourth adjustment slot 162 disposed in the third portion 136 of the adjustment bracket. The third adjustment slot 160 receives a fastener 164 to attach the first portion 132 to the step 18. The fourth adjustment slot 162 receives a fastener (not shown) to attach the third portion 136 of the adjustment bracket 122 to the chassis skirt (not shown).

The at least one third adjustment slot 160 and fourth adjustment slot 162 each have a length dimension that is generally parallel to the forward/aft "F" "A" axis of the vehicle. To adjust the adjustment bracket 122 along the forward/aft "F" "A" axis of the vehicle, the technician merely has to unfasten the fastener 164, and displace the adjustment bracket in the forward/aft "F" "A" direction with respect to the vehicle, and clamp the fastener within the adjustment slot 160. The third adjustment slot 160 allows the adjustment bracket 122 to be fastened to the steps 18 selectively along the forward/aft "F" "A" axis.

Referring to FIG. 5, the chassis skirt mounting assembly 110 is easily accessible when the fastener 164 fastening the adjustment bracket 122 to the steps 18 is removed. The technician can reach down behind the chassis skirt mounting assembly 110 and access the double-sided bolt 140. In this configuration, the horizontal "H", vertical "V" and forward/aft "F" "A" orientations can be finely adjusted independently of each other. In addition to making the assembly process easier and less costly, it also allows designers to incorporate tighter tolerances into the vehicle designs.

The chassis skirt mounting assembly 110 includes a tank strap bracket 120 that facilitates adjustment in the horizontal "H" direction, and an adjustment bracket 122 that facilitates adjustment in the vertical "V" direction, however it is contemplated that the tank strap bracket can facilitate vertical "V" adjustment and the adjustment bracket 122 can facilitate horizontal "H" adjustment. Further, it is contemplated that the length dimensions of the slots 130 and 138 can have both horizontal "H" and vertical "V" components, with the slots 130 and 138 being offset from each other generally 90-degrees.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A chassis skirt mounting assembly for a vehicle having a tank and a chassis skirt, comprising:
   a tank strap bracket attached to the tank and having a first adjustment slot with a first length dimension;
   an adjustment bracket attached to the chassis skirt and having a second adjustment slot with a second length dimension oriented generally 90-degrees offset from the first length dimension of the first adjustment slot;
   a double-sided stud disposed through the first adjustment slot and the second adjustment slot to allow the independent adjustment of the double-sided stud with respect to the first adjustment slot from the adjustment of the double-sided stud with respect to the second adjustment slot, wherein the double-sided stud has a generally tubular shank having a first end and a second end forming an axis, wherein at the first end, a first threaded fastener is received by the shank along the axis towards a center of the shank, and at the second end, a second threaded fastener is received by the shank along the axis towards the center of the shank; and
   a spacer disposed on the shank and configured to be received between the tank strap bracket and the adjustment bracket, the spacer having a first side generally parallel with the first end and a second side generally parallel with the second end, wherein the spacer has a first anti-rotation structure disposed on the first side of the spacer and a second anti-rotation structure disposed on the second side of the spacer, wherein the first anti-rotation structure engages the first adjustment slot of the tank strap bracket, and the second anti-rotation structure engages the second adjustment slot of the adjustment bracket.

2. The chassis skirt mounting assembly of claim 1 wherein the first adjustment slot and the second adjustment slot lay in parallel planes, and further comprising a third adjustment slot disposed on the adjustment bracket in a plane that is generally normal to the parallel planes to provide three-axes of adjustment.

3. The chassis skirt mounting assembly of claim 1 wherein the tank strap bracket includes a first portion that extends around a portion of the circumference of the tank, and a second portion that extends radially from the first portion at a generally 90-degree angle.

4. The chassis skirt mounting assembly of claim 3 wherein the first adjustment slot is disposed through the second portion and the first length dimension is oriented to be substantially horizontal.

5. The chassis skirt mounting assembly of claim 3 wherein the adjustment bracket has a first portion that lays in a substantially horizontal plane.

6. The chassis skirt mounting assembly of claim 5 wherein the adjustment bracket has a second portion that lays in a generally vertical plane and is attached to the second portion of the tank strap bracket with the double-sided stud.

7. A chassis skirt mounting assembly for a vehicle having a tank and a chassis skirt, comprising:
   a tank strap bracket attached to the tank and having a first portion that extends around a portion of the circumference of the tank, and a second portion that extends radially from the first portion at a generally 90-degree angle, the second portion having a first adjustment slot with a first length dimension;
   an adjustment bracket attached to the chassis skirt and having a first portion that lays in a generally horizontal plane, a second portion that lays in a generally vertical plane and is attached to the second portion of the tank strap bracket, the second portion having a second adjustment slot with a second length dimension, the first portion having a third adjustment slot; and
   a double-sided stud disposed through the first adjustment slot and the second adjustment slot, the double-sided stud having a generally tubular shank having a first end and a second end forming an axis, a spacer radially extending from the shank and configured to be received between the tank strap bracket and the adjustment bracket to allow the independent adjustment of the double-sided stud with respect to the first adjustment slot from the adjustment of the double-sided stud with respect to the second adjustment slot, wherein the spacer has a first side generally perpendicular to the axis and a second side generally perpendicular to the axis, and a first anti-rotation structure disposed on the first side of the spacer and a second anti-rotation structure disposed on the second side of the spacer, wherein the first anti-rotation structure engages the first adjustment slot of the tank strap bracket, and the second anti-rotation structure engages the second adjustment slot of the adjustment bracket;
   wherein the first adjustment slot provides adjustment on a first axis, the second adjustment slot provides adjustment on a second axis, and the third adjustment slot provides adjustment on a third axis.

8. The chassis skirt mounting assembly of claim 7 wherein the first adjustment slot and the second adjustment slot lay in parallel planes, and further comprising a third adjustment slot disposed on the adjustment bracket in a plane that is generally normal to the parallel planes to provide three-axes of adjustment.

9. The chassis skirt mounting assembly of claim 7 wherein the tank strap bracket includes a first portion that extends around a portion of the circumference of the tank, and a second portion that extends radially from the first portion at a generally 90-degree angle.

10. The chassis skirt mounting assembly of claim 9 wherein the first adjustment slot is disposed through the second portion of the tank strap bracket.

11. The chassis skirt mounting assembly of claim 9 wherein the adjustment bracket has a first portion that lays in a substantially horizontal plane.

12. The chassis skirt mounting assembly of claim 11 wherein the adjustment bracket has a second portion that lays in a generally vertical plane and is attached to the second portion of the tank strap bracket with the double-sided stud.

13. The chassis skirt mounting assembly of claim 7 wherein the spacer is disposed generally centrally on the shank and is generally disc-shaped.

14. The chassis skirt mounting assembly of claim 13 wherein the first anti-rotation structure is one of attached to and integrally formed with the first side of the spacer.

15. The chassis skirt mounting assembly of claim 14 wherein the first anti-rotation structure is generally rectangular-shaped.

* * * * *